Figure 1:
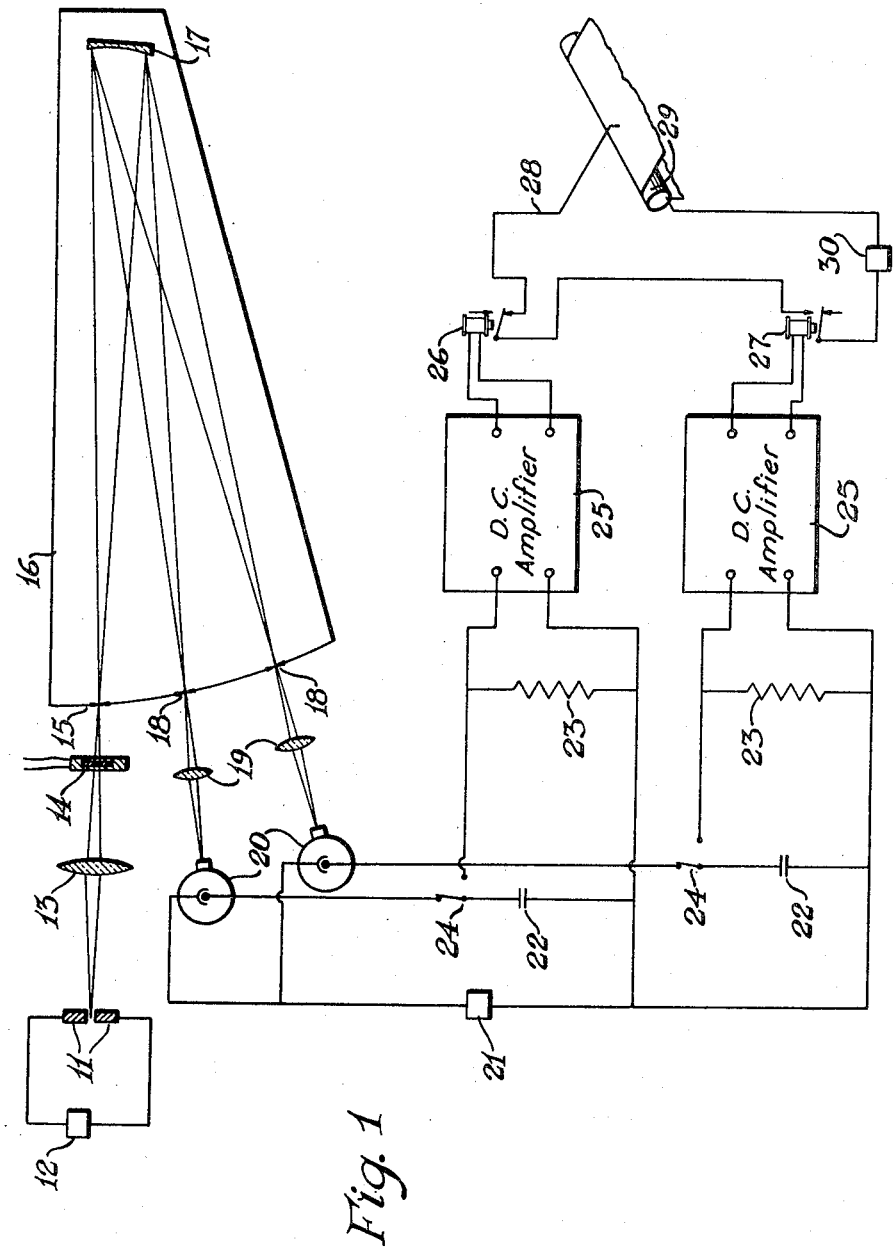

Sept. 24, 1957  V. J. CALDECOURT  2,807,677
STABLE DIRECT-CURRENT AMPLIFIER
Original Filed Feb. 27, 1946  3 Sheets-Sheet 1

INVENTOR.
Victor J. Caldecourt
BY
Griswold & Burdick
ATTORNEYS

Sept. 24, 1957     V. J. CALDECOURT     2,807,677
STABLE DIRECT-CURRENT AMPLIFIER
Original Filed Feb. 27, 1946     3 Sheets-Sheet 2

INVENTOR.
Victor J. Caldecourt
BY
Griswold & Burdick
ATTORNEYS

*INVENTOR.*
Victor J. Caldecourt
BY
*Griswold & Burdick*
ATTORNEYS.

United States Patent Office 2,807,677
Patented Sept. 24, 1957

2,807,677

STABLE DIRECT-CURRENT AMPLIFIER

Victor J. Caldecourt, Midland, Mich., assignor to The Dow Chemical Company, Midland, Mich., a corporation of Delaware Application December 15, 1949, Serial No. 133,181, which is a continuation of application Serial No. 28,138, May 20, 1948, which in turn is a continuation of application Serial No. 650,676, February 27, 1946. Divided and this application March 1, 1951, Serial No. 213,406

1 Claim. (Cl. 179—171)

This invention relates to a highly stable direct-current electron-tube amplifier.

This application is a division of a copending parent application Serial No. 650,676 filed February 27, 1946 by the present applicant together with Jason L. Saunderson and Eugene W. Peterson, now Patent No. 2,577,814. Other divisional applications of the parent are Serial No. 28,138, filed May 20, 1948, now Patent No. 2,647,236, and Serial No. 133,181, filed December 15, 1949, now Patent No. 2,577,815. These applications all relate to an elaborate scientific instrument for automatic spectrochemical analysis by the internal standard method. A description of the instrument also appears in the Journal of the Optical Society, vol. 35, p. 681 ff. (1945).

Quantitative spectrochemical analysis by the internal standard method, an exceedingly valuable tool for the metallurgical industries, has for many years been carried out by photographic methods, such as those described in U. S. Patents 1,979,964 and 2,043,053. In the instrument described in application Serial No. 650,676, photocells connected to appropriate measuring circuits replace the photographic plates of the earlier method. In using the new instrument, the material to be analyzed is formed into electrodes, which are then arranged so that an electric spark can be passed between them. The light produced by the spark is resolved in the instrument by a spectrometer which focuses on sensitive photocells the characteristic spectral lines corresponding to the elements being analyzed for and to the reference element present in the material of the electrodes. These photocells develop minute photocurrents which vary in a manner corresponding to the varying intensities of the spectral lines during the sparking period. The varying photocurrents are integrated by storing them in condensers. After the sparking period, these stored charges are compared by allowing the condensers to discharge through similar resistances and measuring the difference in the times required for such discharges to take place. Electron-tube amplifiers follow the course of the condenser discharges and actuate relays which operate a recorder. The indications of the recorder may be calibrated to show directly the analysis of the material in the electrodes being sparked.

The electron-tube amplifiers which follow the course of the condenser discharges are an important part of the instrument, and it is to these amplifiers that the present application is directed.

Since each amplifier must actuate a relay in response to change in the minute charge stored in a condenser by a photocell, the amplifier must have high gain. On the other hand, each amplifier must also be accurate and stable, preferably with so little drift that adjustment is required only once or twice a day. This is achieved, according to the invention, by means of two-stage direct-current amplifiers which are provided with feed-back networks to render them highly degenerative and hence stable. The amplifiers are normally maintained in the degenerative state. However, at the moment of discharging the photocell condensers, the feed-back networks are temporarily broken, converting the amplifiers to a sensitive or high gain condition. After the discharge, the feed-back circuits are again closed, returning the amplifier to a stable state in which any tendency toward drift is compensated.

Figure 2:
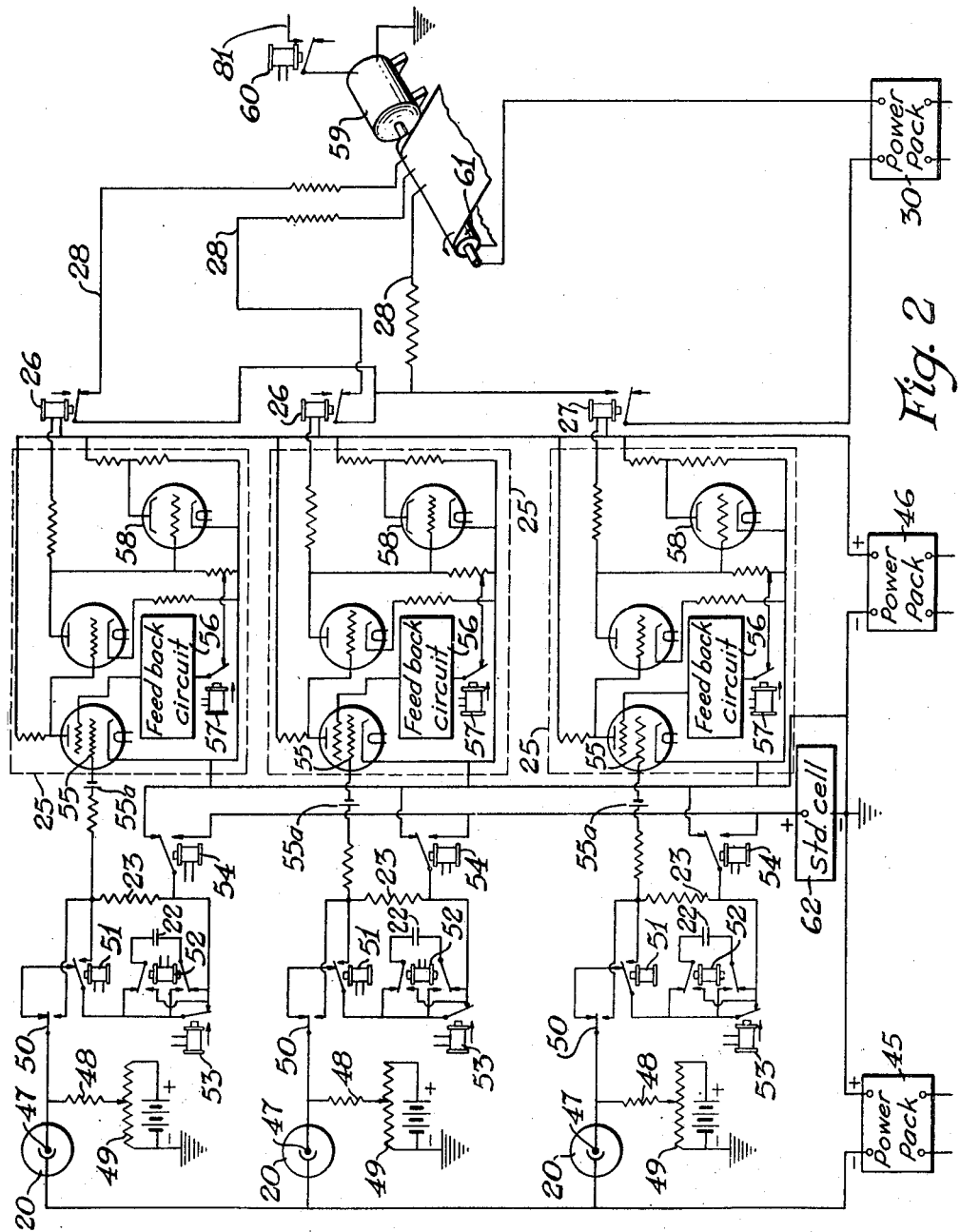
Figure 3:
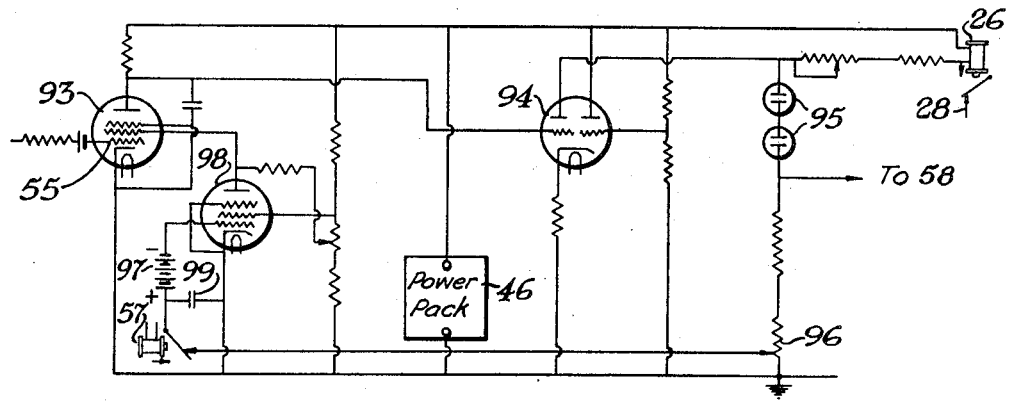

The invention will be further described with reference to the accompanying drawings in which Fig. 1 is a simplified diagram of the interrelation of the various elements of the direct-reading spectrometer, showing the place of the amplifiers in the complete instrument;

Fig. 2 is a diagram of the electric measuring and recording circuits of the complete instrument, illustrating in more detail the manner in which the amplifiers fit into the complete assembly; and Fig. 3 is a detailed circuit diagram of an amplifier.

The essential elements of the complete direct-reading spectrometer, of which the amplifiers of this application are a part, may be explained with reference to the simplified diagram of Fig. 1.

The material to be analyzed is formed into electrodes 11 which are caused to spark by connecting them across a high voltage source 12. Light from this spark is focused by a lens 13 through an electrically-opened normally-closed master shutter 14 onto the entrance slit 15 of a spectrometer 16. The entering light falls on a concave grating 17, which forms images of the slit along the Rowland circle, the positions of these spectral lines being dependent on the wavelengths present in the light. Exit slits 18 are located along the circle in positions to allow passage of selected lines corresponding to the internal reference element and the element being analyzed for in the electrodes 11. These selected lines are focused by lenses 19 on the sensitive elements of electron multiplier photocells 20, the operating potentials of which are supplied by a high voltage source 21.

During sparking of the electrodes, the spectral line falling on each photocell 20 causes a corresponding flow of current, which is stored in a condenser 22 connected in the circuit through a two-way switch 24. Later, the relative magnitudes of the charges thus accumulated are measured by connecting each condensor across its individual discharging resistor 23 by throwing the two-way switches 24. When these switches are thrown, the falling potentials of the condensers are followed by electron-tube direct-current amplifiers 25 in the output circuits of which are voltage-responsive relays 26 and 27 with their output terminals in series. The relay 26 in the circuit corresponding to the spectral line of the unknown element is of the normally-closed type, while the relay 27 in the circuit of the reference element is normally open. Whenever operation of the amplifiers holds the contacts of both relays closed at the same time, the pen circuit 28 of a moving-tape recorder 29 is energized by a source 30, causing a mark to appear on the tape.

In practice, it is necessary to choose the reference spectral line, or to design the circuits, so that during sparking the reference condenser reaches a higher potential than the other condensers. The relays and amplifiers are adjusted so that the relays are actuated whenever the potentials across the condensers exceed a predetermined low value, conveniently about 1.0 volt.

In making an analysis, the switches 24 are set to connect the photocells to their condensers, and the sample to be analyzed is sparked. The resulting spectral lines falling on the photocells 20 cause photocurrents which charge the condensers 22 at rates proportional to the intensities of the incident lines. After the sparking period, the switches 24 are thrown simultaneoulsy, whereupon the condensers 22 begin to discharge through their resistors 23. As soon as the switches close, the amplifiers 25 detect condenser voltages well over the predetermined low value, and actuate both relays 26 and 27, leaving the recorder circuit still open. As discharge of the condensers continues, the falling potential in the condenser corresponding to the unknown element reaches the predetermined low value first, whereupon the relay 26 is de-actuated and closes. Current at once flows in the recorder circuit 28, making a visual record on the moving tape. When, after an interval of time, the falling potential across the reference condenser also reaches the predetermined value, the relay 27 is de-actuated, and the recorder circuit is again broken. As a result of this sequence, the length of the mark on the moving recorder tape is a direct indication of the difference in times of discharge of the reference and the unknown condensers. This difference is a function of the concentration of the unknown element in the sample. The manner in which the recorder tape is interpreted in terms of the analysis of the electrodes 11 is explained in detail in the parent application Serial No. 650,676.

The electrical measuring circuits indicated schematically in Fig. 1 are shown in more detail in Fig. 2. For simplicity, this latter shows only three multiplier phototubes and measuring circuits, for determining the relative intensities of two unknown spectral lines relative to the same internal standard line. In Fig. 2, the timing circuits for actuating the various relays are not shown, and the electron-tube amplifiers are indicated in simplified form. The circuit is shown in its normal position before an analysis is run.

The operating potential for all the electron-multiplier tubes is supplied by a 1000-volt regulated power supply 45 constructed essentially according to the Miller design (Electronics, November 1941, p. 29). The 250-volt amplifier power pack 46 is of a similar type.

The dark-current of each phototube 20 is compensated by a leak circuit in which the photocell anode 47 is connected through a high resistance 48 (1000 megohms) to a potentiometer 49 (100 volts), one terminal of which is grounded.

During the sample sparking period, the output of each photocell, except for the small dark-current compensation, passes in series through a manual test switch 50 and the normally-closed contacts of a relay 51 to its storage condenser 22, the return circuit being through the normally closed contact of a relay 54. Actuation of the relay 54 interposes a standard cell 62 in the return circuit. The polarity of the condenser may be changed by a reversing relay 52, for purposes described in the parent application Serial No. 650,670, and the condenser is shorted, except during measurements, by another relay 53.

At the end of the sparking period, each condenser may be isolated from its photocell and connected directly across its discharging resistor 23 by operation of the relay 51. As this operates, each condenser is connected through a bias cell 55a to the input grid 55 of the corresponding amplifier 25, which in turn actuates a corresponding recorder relay 26 or 27.

Each amplifier 25, which will be more fully described later, comprises two stages and is stabilized by a feedback circuit 56 which may be broken by a relay 57. The magnitude of the amplifier output is indicated visually by an electron-ray tube 58, the ray-control grid of which is connected in the plate circuit of the second amplifier stage.

The recorder relays 26 and 27 in the amplifier outputs control the recorder pen circuits 28, as already explained with reference to Fig. 1. The recorder, which is conveniently of the moving-tape type described in Patent 2,251,742, is driven by a self-starting synchronous motor 59, the power supply of which flows through a relay 60.

In the circuit illustrated, the storage condensers 22 should preferably be of such construction as to retain little residual charge after they have been discharged rapidly, condensers using polystyrene as the dielectric being especially suitable (J. Opt. Soc. Amer. 35, 690 (1945)). The electrical magnitudes of the capacitance of each condenser (0.1 to 1.0 microfarad) and of the resistance of each discharging resistor (5 to 50 megohms) are chosen so that their mathematical product is of the order of several seconds and is substantially equal for all condenser-resistor pairs in the apparatus.

Operation of circuit

As long as the relays are in the positions shown in Fig. 2, the input grids 55 of the amplifiers 25 are all maintained at a fixed potential below ground potential determined by the bias cells 55a. With this condition obtaining, the operator first adjusts each amplifier-relay circuit so that each indicator tube 58 or "magic eye" is just "closed," and so that each recorder relay 26 or 27, though still in the normal position, will be activated whenever the corresponding amplifier input-grid potential is depressed below the aforesaid bias potential.

With the amplifiers thus normalized, and with the photocells 20 receiving no light, dark current compensation is made. Each test switch 50 is thrown, connecting each photocell directly to its amplifier input grid. At the same time, the feedback relay switches 57 are opened to place the amplifiers in the high-gain state. Each voltage-divider 49 is then adjusted until the corresponding indicator tube 58 is again "closed." The entire dark current of each photocell is thus balanced out, and flows through its leak resistance 48. The switches 50 and 57 are returned to normal positions, and the measuring circuits are ready for use.

In making an analysis with the spectrometer utilizing the measuring circuit of Fig. 2, the sample to be analyzed is first sparked for a few seconds, after which the exposure period is initiated by a timing system later mentioned which actuates the master shutter 14 (Fig. 1) and the condenser shorting relays 53 (Fig. 2) at the same instant. The light of the spark then enters the spectrometer and the resulting spectral lines fall on the photocells 20, causing photocurrents to flow; the condensers 22, simultaneously unshorted, store these photocurrents throughout the sparking period.

When the exposure period has ended, the timing system closes the master shutter 14, cutting off all light to the photocells. It simultaneously closes the recorder motor relay 60, setting the recorder roll 61 in motion. The condenser measuring relays 51 and 54 and the feedback circuit relay 57 are then actuated simultaneously, connecting the condensers 22 across their discharging resistors 23, isolating the amplifier input grids 55 from ground, connecting the standard cell 62 in circuit, and converting the amplifiers to a high-gain condition. Assuming that the potentials on the charged condensers all exceed in magnitude that of the standard cell, the amplifier input grids 55 instantly detect potentials below the bias potential, and the amplifiers actuate the recorder relays 26 and 27. The recorder pen circuits 28 for the unknown elements remain open, but the circuit for the reference element, involving the relay 27, is at once closed, so that recording begins on this one pen. Then, when the decreasing potentials on the condensers of the unknown elements reach voltages equal in magnitude to that of the standard cell, i. e. when the grids 55 reach bias potential, the relays 26 are released, and the remaining recorder pen circuits close and cause marking of the recorder tape. As soon as the decreasing potential on the reference element condenser also equals that of the standard cell, its amplifier deactuates the relay 27, and the pen circuits are again broken, so that all recording stops. The condenser discharge relays 51 and 54, the condenser shorting relay 53, the amplifier feedback relay 57, and the motor relay 60 are then all released, placing the circuits in the normal or inactive condition, as in Fig. 2, and returning the amplifiers to the degenerative or self-stabilizing state. The entire apparatus is then ready for another analysis.

The details of the timing mechanism for initiating the operating impulses of the various relays and spark circuits of the overall instrument are explained in the parent application Serial No. 650,676.

A circuit diagram of the direct-current amplifier 25 used in following the falling potentials on the photocell condensers of the spectrometer is given in Fig. 3.

As shown, the first stage of the amplifier consists of a high gain pentode 93 with low screen and plate voltages, e. g. a 6J7 or 6C6, so that the input resistance will be high. This first stage is direct-coupled to the second stage 94, comprising two triodes in one envelope, e. g. a 6SN7, operated at conventional voltages and connected to stabilize the plate current. The output of this stage is supplied to the recording pen relay 26, as previously described. The amplifier is rendered highly stable by a feed-back circuit comprising neon glow lamps 95, a voltage-divider 96, battery 97, and a third stage or pentode 98, e. g. a 6J7, the plate of which is coupled to the second grid of the first stage. The feedback circuit may be broken by the feedback relay switch 57. The terminal of the switch 57 connected through the battery 97 to the control grid of the third stage is also connected to a condenser 99, conveniently of about 1.0 microfarad capacity, the other side of the condenser being connected to the cathode of the third stage.

As long as the feedback circuit is closed, the amplifier is in a low gain, highly stable state and exhibits little drift. At the same time, the condenser 99 acquires a charge consistent with the balance in the system. Then, when the feedback circuit is opened by the relay 57 in response to the timing system of the spectrometer, the amplifier is converted to a high gain condition for the measuring period. However, during this period, the condenser 99 tends to retain its charge, preventing the third-stage grid potential from changing appreciably during the high-gain period. Thus, when the relay 57 is again closed at the end of the measuring period, the amplifier is returned to the original stable condition.

The amplifier of Fig. 3, by virtue of the action of the condenser 99 and the feedback circuit, remains balanced almost indefinitely, and requires adjustment of the voltage-divider 96 perhaps only once a week while in continuous use.

What is claimed is:

A stabilized direct current amplifier comprising an input stage including a vacuum tube having a cathode electrode, control grid electrode, screen grid electrode, suppressor grid electrode and output electrode, said suppressor grid electrode being connected to said cathode, said cathode being grounded, an input circuit connected between said control grid and ground, a condenser connected between said output electrode and ground, a power source having a high potential terminal and a ground terminal, said ground terminal being grounded, said output electrode of said input stage being connected to said high potential terminal through a resistor, a second amplifier stage including a dual triode vacuum tube, said dual triode tube having a first section including a control grid and an anode, a second section including a control grid and anode, and a cathode which is common to both sections, said common cathode being grounded through a resistance, the control grid of said first section being connected to the output electrode of said input stage, the control grid of said second section being connected to said high potential terminal through a resistance and to ground through a resistance, said anode of said second section being connected to said high potential terminal and through an inductive element, fixed resistor and a variable resistance to the anode of said first section, a glow discharge device, a fixed resistor, and a potentiometer having a movable arm, said glow discharge device, fixed resistor and potentiometer being connected between the anode of said first section and ground, a feedback stage comprising a pentode vacuum tube having a cathode, control grid, screen grid, suppressor grid and anode, said cathode of said feedback tube being grounded, said anode of said feedback tube being connected to the screen grid electrode of said input stage tube, a voltage divider network including a first fixed resistance and a second fixed resistance and a potentiometer having an adjustable arm, the potentiometer being connected between said first and second fixed resistance, the voltage divider network being connected between said high potential terminal and ground, the first fixed resistor being connected to the high potential terminal, said screen grid of said feedback tube being connected between said potentiometer and said first resistor, the adjustable arm of said potentiometer of said voltage divider network being connected through a resistance element to the anode of said feedback tube, a source of fixed bias potential and a condenser, said source of fixed bias potential and said condenser being connected in series, the source of bias potential being electrically connected to the control grid of the feedback tube and the condenser being electrically connected to ground, and switch means for selectively connecting said moveable arm between said source of bias potential and said condenser.

References Cited in the file of this patent

UNITED STATES PATENTS

| | | |
|---|---|---|
| 2,190,743 | Vance | Feb. 20, 1940 |
| 2,210,390 | Wecthers | Aug. 6, 1940 |
| 2,210,997 | Anderson | Aug. 13, 1940 |
| 2,300,133 | Nyquist | Oct. 27, 1942 |
| 2,354,718 | Tuttle | Aug. 1, 1944 |
| 2,375,283 | Cloud | May 8, 1945 |
| 2,459,730 | Williams | Jan. 18, 1949 |
| 2,462,190 | Hipple et al. | Feb. 22, 1949 |
| 2,559,515 | Pourciac | July 3, 1951 |

FOREIGN PATENTS

| | | |
|---|---|---|
| 620,140 | Great Britain | Mar. 21, 1949 |